United States Patent [19]

Takata et al.

[11] Patent Number: 5,536,091
[45] Date of Patent: Jul. 16, 1996

[54] THRUST BALL BEARING FOR USE WITH POWER ROLLERS

[75] Inventors: Hirotoshi Takata, Yokohama; Takanobu Sato, Odawara; Ryo Goino, Yokohama, all of Japan

[73] Assignee: NSK Ltd., Tokyo, Japan

[21] Appl. No.: 387,087

[22] Filed: Feb. 13, 1995

[30] Foreign Application Priority Data

Feb. 18, 1994 [JP] Japan .................. 6-021415
Feb. 25, 1994 [JP] Japan .................. 6-028401

[51] Int. Cl.⁶ .................... F16C 19/10; F16H 15/00
[52] U.S. Cl. .................. 384/609; 384/615; 476/46
[58] Field of Search ...................... 384/608, 609, 384/615; 476/46, 42, 40

[56] References Cited

U.S. PATENT DOCUMENTS

| | | | |
|---|---|---|---|
| 3,164,025 | 1/1965 | Francisco, Jr. | 476/46 X |
| 4,126,052 | 11/1978 | Jackman | 476/46 X |
| 4,325,592 | 4/1982 | Kraus | 384/608 |
| 4,386,536 | 6/1983 | Kraus | 476/40 X |
| 4,398,778 | 8/1983 | Kraus | 384/608 |
| 4,400,987 | 8/1983 | Kraus | 476/40 |
| 4,523,863 | 6/1985 | Okoshi | 384/609 |
| 4,909,092 | 3/1990 | Machida et al. | 476/40 X |
| 5,391,126 | 2/1995 | Fukushima et al. | 384/614 X |

FOREIGN PATENT DOCUMENTS

| | | | |
|---|---|---|---|
| 2541407 | 8/1984 | France | 476/42 |
| 62-71465 | 5/1987 | Japan . | |
| 62-199557 | 12/1987 | Japan . | |
| 255758 | 10/1989 | Japan | 476/46 |
| 261441 | 11/1926 | United Kingdom | 384/615 |

Primary Examiner—Thomas R. Hannon
Attorney, Agent, or Firm—Shapiro and Shapiro

[57] ABSTRACT

The contact angle of each of the balls of a thrust ball bearing for use with power rollers is deviated from 90 degrees. Thus the power roller is not easily displaced in the radial direction when radial loads are exerted. Also, the distance in the radial direction between the acting point of loads applied to the circumferential surface of the power roller and the contacting point of the rolling surface of each ball and the inner ring raceway is decreased. In this way, any bending stresses to be exerted on the power roller by the application of the aforesaid loads are eased.

In another embodiment, the thickness dimension of the outer ring is made greater in the portion closer to the inner circumference, and smaller in the portion closer to the outer circumference with the outer ring raceway as boundary. Thus the width dimension of the circumferential surface of the power roller is made larger, and the strength of the outer ring is enhanced against bending stresses.

8 Claims, 7 Drawing Sheets

THRUST BALL BEARING FOR USE WITH POWER ROLLERS

BACKGROUND OF THE INVENTION

1. Field of the Invention

This invention relates to a thrust ball bearing for use with power rollers. More particularly, the invention relates to a thrust ball bearing utilized for supporting thrust loads exerted on each of the power rollers, which for example, form part, of a toroidal-type continuously variable transmission.

2. Related Background Art

Figure 3:
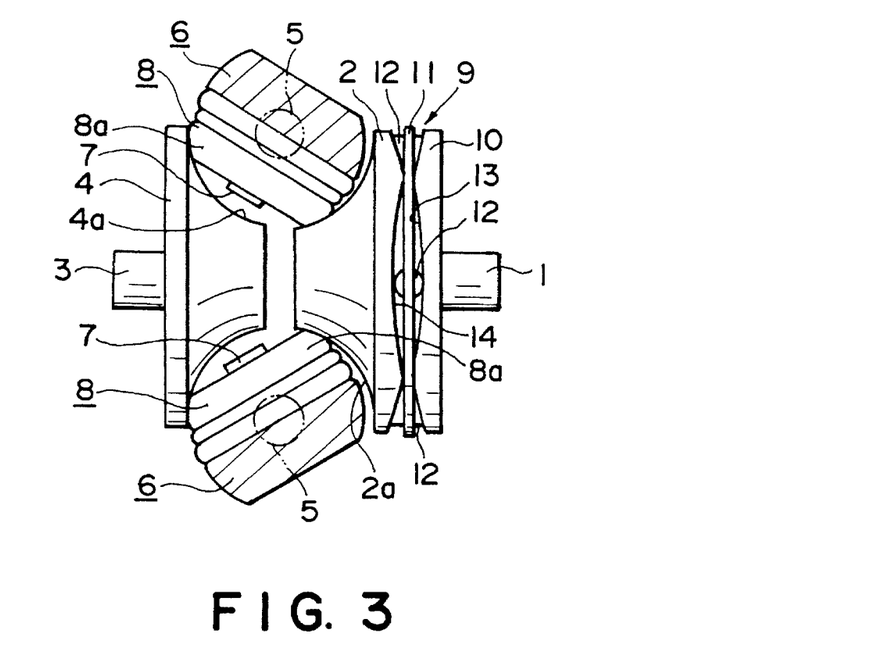
FIG. 3 is a side view which shows the fundamental structure of a toroidal-type continuously variable transmission having a thrust ball bearing incorporated in it, and also shows a state in which speed is reduced to a minimum.
Figure 4:
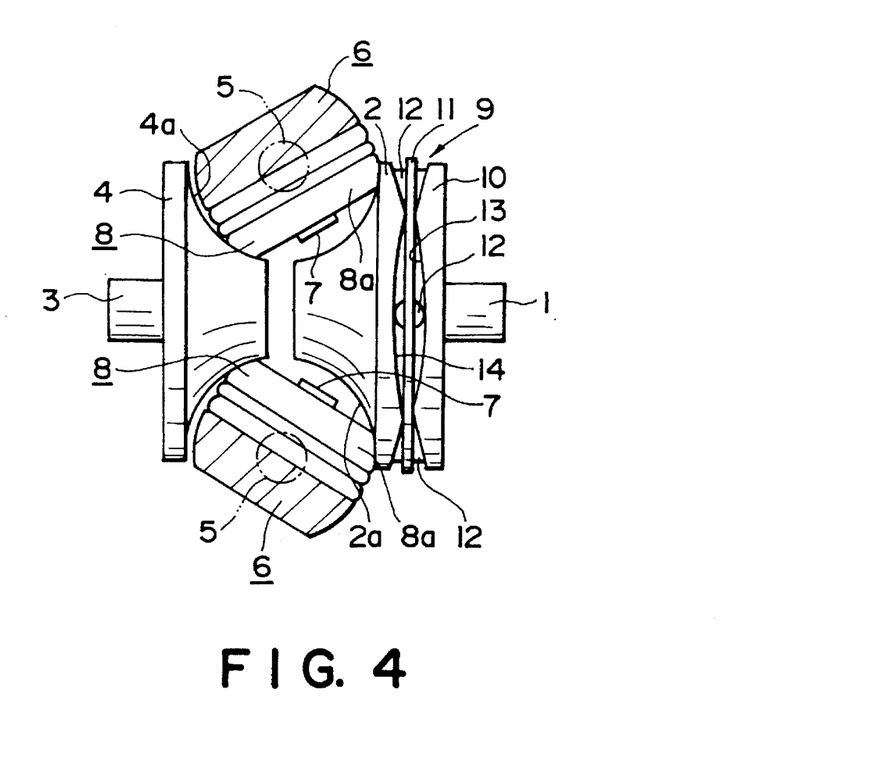
FIG. 4 is a side view which shows the fundamental structure of a toroidal-type continuously variable transmission having a thrust ball bearing incorporated in it, and also shows a state in which speed is increased to a maximum.

The use of a toroidal-type continuously variable transmission, which is schematically shown in FIG. 3 and FIG. 4, is under study as a speed change gear for an autovehicle or various kinds of industrial machinery. This toroidal-type continuously variable transmission is such that a disc 2 on the input side is supported coaxially with an input shaft 1, and a disc 4 on the output side is fixed to the end portion of an output shaft 3 which is coaxially arranged with the input shaft 1 as disclosed in the specification of Japanese Utility Model Laid-Open Application No. 62-71465, for example. On the inner side of the casing where the toroidal-type continuously variable transmission is housed or in the supporting brackets arranged in this casing, trunnions 6 and 6 are provided swingably centering on the pivots 5 and 5 arranged in orthogonal positions with respect to the input shaft. 1 and output shaft 3.

The trunnions 6 and 6 are provided with the pivots 5 and 5 on the outer faces of both ends. On the central portions of the trunnions 6 and 6, the base ends of the displacement shafts 7 and 7 are supported, respectively. The trunnions 6 and 6 are allowed to swing centering on the pivots 5 and 5 to make it possible to freely adjust each inclined angle of the displacement shafts 7 and 7. Around the displacement shafts 7 and 7 supported by the trunnions 6 and 6, power rollers 8 and 8 are rotatively supported, respectively. Each of the power rollers 8 and 8 is pinched between the discs 2 and 4 on the input and output sides.

The inner faces 2a and 4a, where the discs 2 and 4 on the input and output sides face each other, are concave in their respective cross-sections, each of which is obtainable by rotating its circle centering on the aforesaid pivot 5. The spherically convex circumferential surfaces 8a and 8a of the power rollers 8 and 8 abut the inner faces 2a and 4a.

Between the input shaft 1 and the disc 2 on the input side, a pressing device 9 of a loading cam type is arranged. By this pressing device 9, the disc 2 on the input side is pressed elastically toward the disc 4 on the output side. The pressing device 9 includes a cam plate 10 which rotates together with the input shaft 1, and a plurality of rollers 12 (four rollers, for example) supported by a cage 11. On one side face (on the left side face in FIG. 3 and FIG. 4) of the cam plate 10, a concave and convex cam surface 13 is formed. Likewise, on the outer surface (on the right side face in FIG. 3 and FIG. 4) of the disc 2 on the input side, a cam surface 14 is formed. Thus the plurality of rollers 12 are rotatively supported in the radial direction around the axis with respect to the center of the input shaft 1.

When the toroidal-type continuously variable transmission structured as described above is used, the plurality of rollers 12 are pressed against the cam surface 14 on the outer side face of the disc 2 on the input side by the rotation of the cam surface 13 and the cam plate 10 following the rotation of the input shaft 1. Therefore, at the same time that the disc 2 on the input side is pressed against the power rollers 8 and 8, the disc 2 on the input side rotates when the pair of cam surfaces 13 and 14 engage with the plurality of rollers 12. The rotation of the disc 2 on the input side is transmitted to the disc 4 on the output side through the power rollers 8 and 8. In this way, the output shaft 3 fixed to the disc 4 on the output side rotates.

When the rotational speed of the input shaft 1 and output shaft 3 should be changed, and speed reduction should be performed the input shaft 1 and output shaft 3, the trunnions 6 and 6 are caused to swing around the pivots 5 and 5 to incline the displacement shafts 7 and 7, respectively, as shown in FIG. 3. The circumferential surfaces 8a and 8a of the power rollers 8 and 8 can abut the portion close to the center of the inner side face 2a of the disc 2 on the input side, and the portion close to the outer circumference of the inner side face 4a of the disc 4 on the output side.

In order to accelerate, the trunnions 6 and 6 are caused to swing to incline the displacement shafts 7 and 7, respectively, as shown in FIG. 4. The circumferential surfaces 8a and 8a of the power rollers 8 and 8 can abut the portion close to the outer circumference of the inner side face 2a of the disc 2 on the input side, and the portion close to the center of the inner side face 4a of the disc 4 on the output side, If each of the displacement shafts 7 and 7 is set at an intermediately inclined angle between those shown in FIG. 3 and FIG. 4, an intermediate reduction ratio can be obtained between the input shaft 1 and output shaft 3.

In this respect, FIG. 3 and FIG. 4 are views which show only the fundamental structure of a toroidal-type continuously variable transmission, but there have hitherto been known various structures which are more specific as transmissions for an autovehicle and others, such as disclosed on the microfilm of Japanese Utility Model Application No. 61-87523 (Japanese Utility Model Laid-Open Application No. 62-199557).

Figure 5:
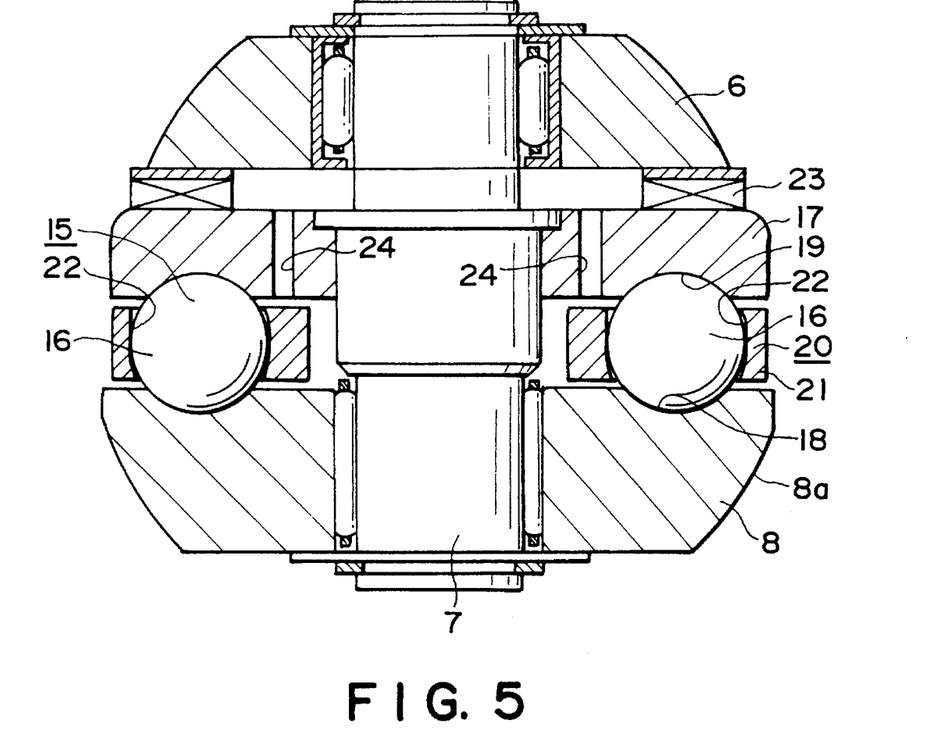
FIG. 5 is a cross-sectional view which shows a thrust ball bearing and the portion where its lubricating device is arranged.

Now, when a toroidal-type continuously variable transmission described above is in operation, the power rollers 8 and 8 rotate at a high speed while receiving the thrust loads from the disc 2 on the input side and the disc 4 on the output side. Therefore, as shown in FIG. 5, a thrust ball bearing 15 is arranged between each power roller 8 and the corresponding trunnion 6.

The thrust ball bearing 15 comprises the power roller 8 which functions as an inner ring; a plurality of balls 16 a cage 20 for rotatively holding the balls 16; and an outer ring 17. The power roller 8, balls 16, and outer ring 17 are formed from bearing steel or ceramic. Also, on the one axial side face (upper face in FIG. 5) of the power roller 8, the inner ring raceway 18 is formed. On the other axial side face (lower face in FIG. 5) of the outer ring 17, where it faces the inner ring raceway 18, the outer ring raceway 19 is formed. These raceways 18 and 19 are sectionally circular, but annular as a whole. The rolling surfaces of the balls 16 are rotatively in contact with the inner and outer ring raceways 18 and 19.

Also, the cage 20 has an annular main body 21 made of metal or synthetic resin. On the main body 21, circular pockets 22 are formed in positions at equal intervals in the circumferential direction between the inner and outer diameters. Each of the balls 16 is rotatively held in each of the pockets 22 in one to one correspondence. Further, the outer ring 17 is abutted upon the inner side face of each trunnion 6 through a thrust bearing 23, such as a needle bearing or a sliding bearing. The thrust bearing 23 allows the trunnion 6 to be displaced with respect to the outer ring 17. The displacement shaft 7 supports the base portion rotatively on the trunnion 6 in order to enable the power roller 8 to follow any deviation of the discs 2 and 4 on the input and output sides, and the leading end of the displacement shaft 7 is arranged eccentrically with respect to the base portion. On this leading end, the power roller 8 is rotatively supported. Therefore, when the power roller follows the deviation of the discs, the outer ring 17 is allowed to be displaced with respect to the trunnion 6. Therefore, the thrust bearing 23 is provided as described above in order to reduce the force required for this displacement, and enhance the capability of the power roller 8 to follow its counterpart.

Figure 6:
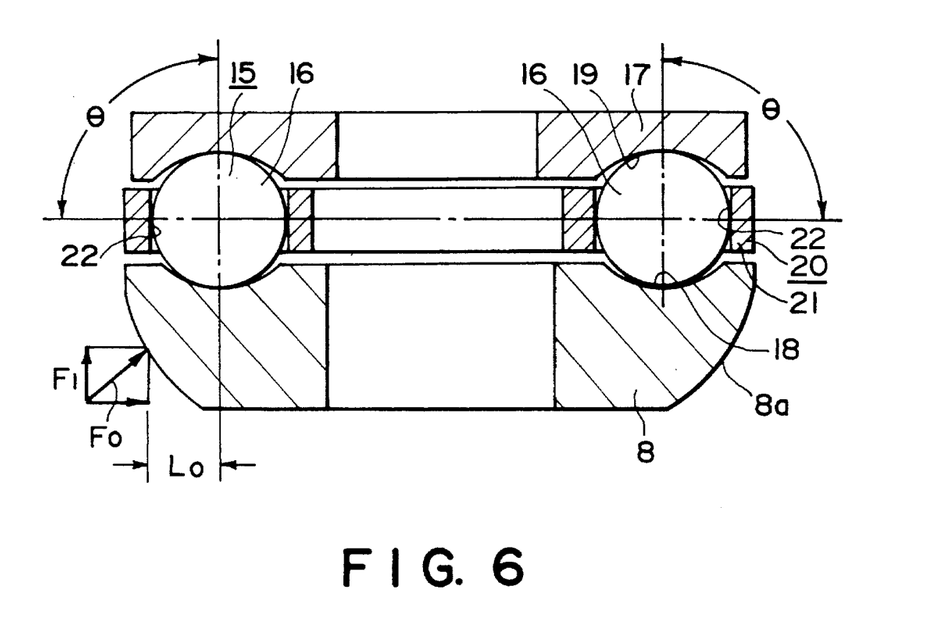
FIG. 6 is a cross-sectional view which represents only the thrust ball bearing of FIG. 5.

When the toroidal-type continuously variable transmission is in operation, the thrust ball bearing 15 rotates at a high speed while supporting the thrust loads exerted on each of the power rollers 8 Therefore, the contact angle (an angle formed by the direction of loads given from the balls 16 to each of the raceways, and the plane perpendicular to the central axis of the thrust bearing 15), which is conventionally considered for the thrust ball bearing 15 used in a toroidal-type continuously variable transmission, has been 90 degrees, as represented in FIG. 6. A reference numeral 24 in FIG. 5 designates lubricators for supplying lubricant to the thrust ball bearing 15.

When thrust ball bearings are actually incorporated in a toroidal-type continuously variable transmission for supporting the power rollers 8, there are the points (1) and (2) described below which are yet to be solved.

(1) The distance is not necessarily small in the radial direction between the acting point of loads exerted on the power roller 8 by the disc 2 on the input side and the disc 4 on the output side, and the contacting point of the rolling surface of each of the balls 16 and the inner ring raceway 18. As a result, depending on the loads exerted on each power roller 8 from the aforesaid acting point, great bending stresses tend to be applied to the power roller 8. In other words, when the toroidal-type continuously variable transmission is in operation, loads $F_0$ are applied locally to the circumferential surface $8a$ of the power roller 8 by the inner side faces $2a$, $4a$ of the discs 2, 4 in the direction perpendicular to this circumferential surface $8a$. Then, in accordance with the component force $F_1$ of the loads $F_0$ in the thrusting direction, bending stresses are exerted on the power roller 8 centering on the aforesaid contacting point.

The magnitude of bending stresses is proportional to the distance $L_0$ between the aforesaid acting point and contacting point in the radial direction. In the conventional toroidal-type continuously variable transmission, this distance $L_0$ is not necessarily small, and the aforesaid bending stresses become comparatively large. Hence there is a possibility that damage such as cracking occurs in the power roller when it is used for a long time.

(2) When loads are applied to the power roller 8 in the radial direction while a toroidal-type continuously variable transmission is in operation, the power roller 8 tends to be displaced in the radial direction. In other words, on the circumferential surface of the power roller 8, loads are exerted not only in the thrusting direction, but also, exerted in the radial direction in accordance with the displacement of the displacement shaft 7 resulting from the changes of speed or in accordance with its assembling precision and dead weight. Thus in accordance with the radial loads, the power roller 8 is displaced in the radial direction. Particularly, if the contact angle of each of the balls 16 is 90 degrees as in the conventional case, the blocking forces are weak when the power roller 8 tends to be displaced by the application of the radial loads. This as shown in FIG. 7, the power roller 8 is eventually displaced in the radial direction with respect to the outer ring 17.

Figure 7:
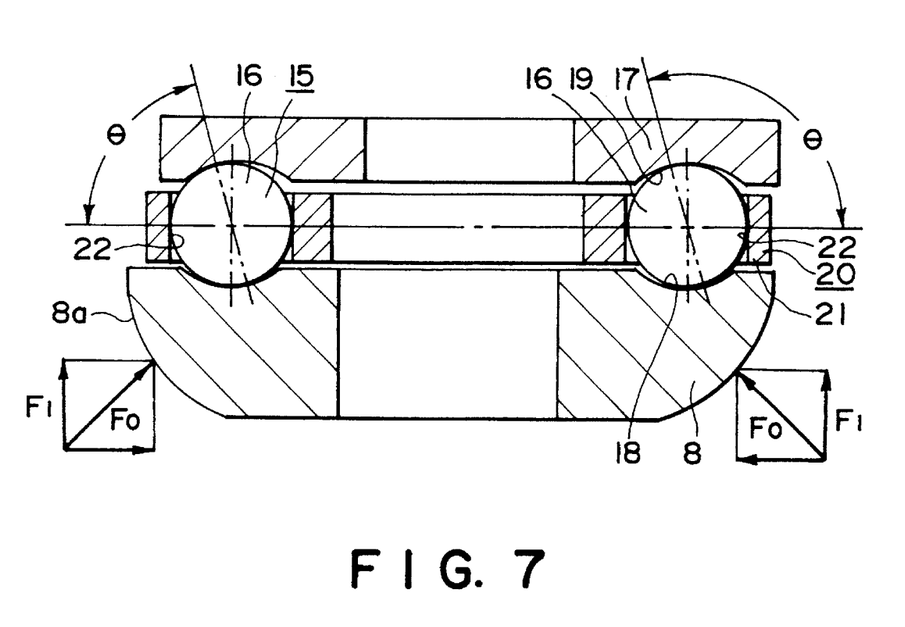
FIG. 7 is the same as FIG. 6, but represents a state wherein radial loads are exerted on the thrust ball bearing.

As a result, the contact angle θ of each of the balls 16 becomes more than 90 degrees in certain positions (on the right side in FIG. 7) in the circumferential direction while it becomes less than 90 degrees in some other positions (on the left side in FIG. 7). If the contact angle θ varies about 90 degrees in such a manner as described above, the ball undergoes an extremely complicated motion in addition to the motion usually observed. In other words, it revolves while rotating on its own axis because the contact angle θ varies continuously. Then, in addition to such a complicated motion as this, influence is exerted by the gyromoment and spin of each ball to produce adverse effects on the balls 16, inner ring raceway 18, and outer ring raceway 19, thereby allowing them to be subjected to frictional wear and shortened fatigue life. Thus the durability of the thrust ball bearing is inevitably diminished. In consideration of these circumstances, the present invention is designed to provide a thrust ball bearing for use with power rollers.

Figure 10:
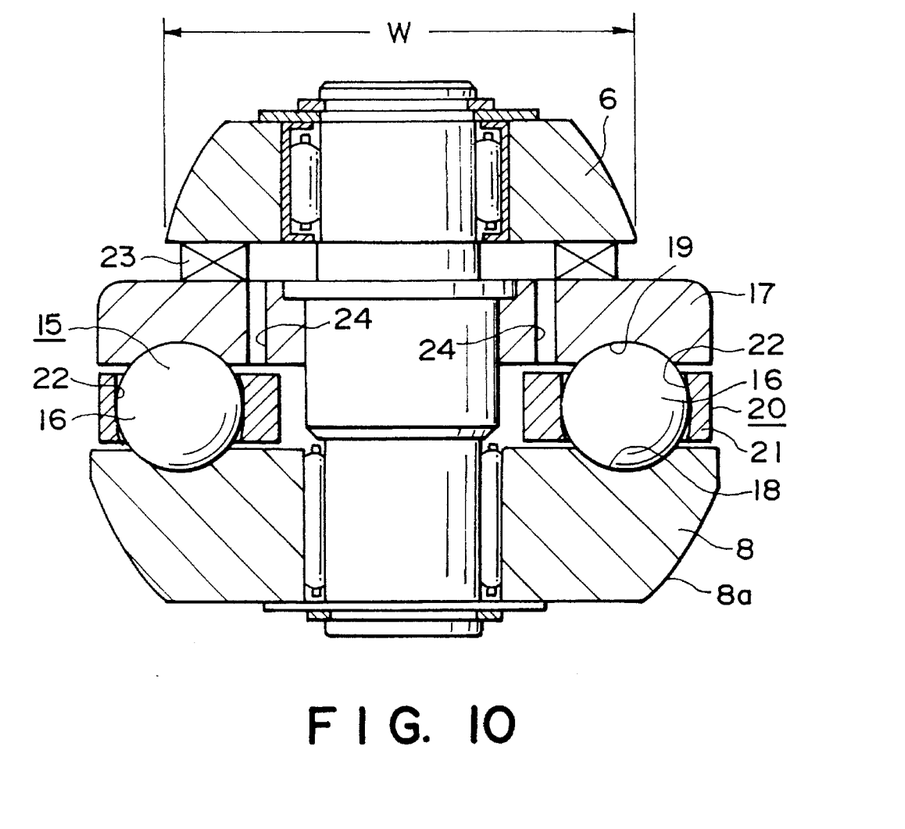
FIG. 10 is a cross-sectional view which shows a thrust ball bearing and the portion where its lubricating device is arranged.

The structure and operation of a toroidal-type continuously variable transmission shown in FIG. 10 are substantially the same as those described in conjunction with FIG. 5. Therefore, the description thereof will be omitted.

Figure 11:
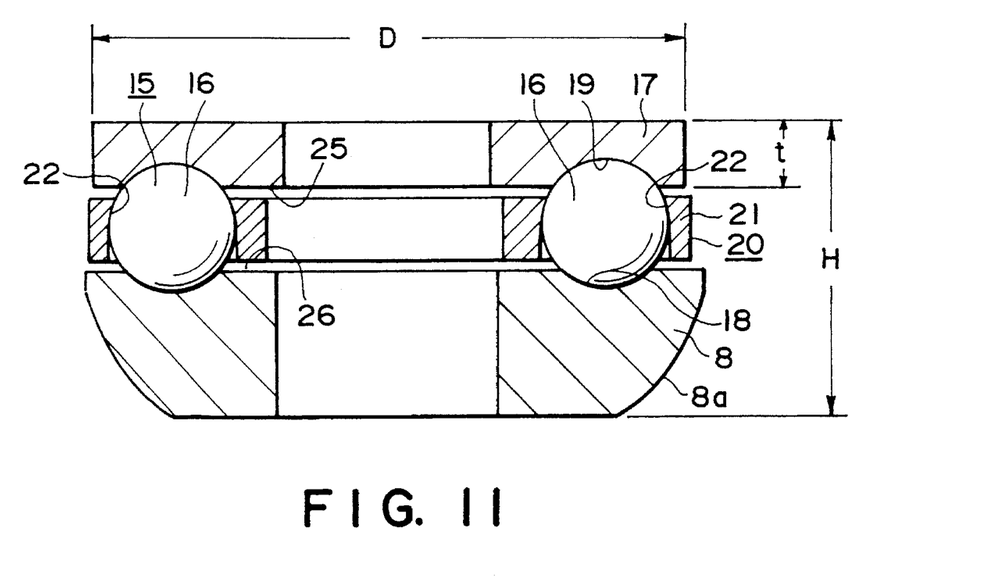
FIG. 11 is a cross-sectional view which represents only the thrust ball bearing of FIG. 10.

When a toroidal-type continuously variable transmission is in operation, the thrust ball bearing 15 rotates at a high speed while supporting the thrust loads exerted on each of the power rollers 8. At this juncture, lubricant is supplied to the thrust ball bearing 15 through the lubricator 24. As shown in FIG. 11, the dimension t of the thickness of the outer ring 17, which forms the thrust ball bearing 15 serving such a purpose as described above, is conventionally formed evenly from the inner circumferential edge to the outer circumferential edge (with the exception of the portion of outer ring raceway 19). In other words, the one axial side face 25 of the outer ring 17 which constitutes the outer ring raceway 19, lies in a single plane which intersects the axis with the exception of the outer ring raceway 19. Also, the one axial side face 26 of the power roller 8 which functions as the inner ring, lies in a single plane which intersects the axis with the exception of the inner ring raceway 18. Further, both side faces of the cage 20 lies in a single plane which is parallel to each of the axial side faces 25 and 26.

However, when the thrust ball bearing 15 is actually incorporated in a toroidal-type continuously variable transmission to support each power roller 8, it is difficult for the reasons given below to attempt making the bearing smaller while securing sufficient durability.

The width dimension W (FIG. 10) of the trunnion 6 for supporting the power roller 8 through the aforesaid thrust ball bearing 15 cannot be made too large, since it is desirable to keep the construction lightweight and to avoid interference between both side edges of the trunnion 6 and the inner side faces $2a$, $4a$ of the discs 2, 4 on the input and output sides. As a result, the outer diametral dimension D of the outer ring 17 of the thrust ball bearing 15 becomes larger than the aforesaid width dimension W. Thus a part of the portion close to the outer circumference of the outer ring 17 is projected from both end edges of the trunnion 6. This part of the portion close to the outer circumference is of course projected outward in the diametral direction from the thrust ball bearing 23 arranged between the trunnion 6 and the outer ring 17.

Particularly, when a part of the outer ring raceway 19 is projected outwardly beyond the thrust bearing 23 in the diametral direction, great bending stresses are exerted on the outer ring 17 due to the thrust loads applied from the power roller 8 to the outer ring 17 through the balls 16. In order to secure the durability of the outer ring 17 despite such bending stresses, the thickness dimension t of the outer ring 17 might be made larger.

However, if the thickness dimension t of the outer ring 17 were made larger, the height dimension H would become larger for the thrust ball bearing for use with power rollers including this outer ring 17 and power roller 8. It is not desirable to increase this height dimension H because such increase directly results in a larger size of the toroidal-type continuously variable transmission and increased weight as well. Also, if the aforesaid thickness dimension t is increased while maintaining the height dimension H at a constant level, the thickness dimension of the power roller 8 would have to be made smaller to that extent, resulting inevitably in a narrower width of the circumferential surface 8a of the power roller 8. The circumferential surface 8a functions as the so-called traction surface which transmits the power between the aforesaid inner side faces 2a and 4a. It is not desirable, to reduce the width dimension of a circumferential surface such as this because it results directly in the lowered efficiency of the power transmission. Therefore, in consideration of these circumstances, the present invention is designed to provide a thrust ball bearing for use with power rollers.

SUMMARY OF THE INVENTION

In accordance with one of its aspects, a thrust ball bearing of the present invention for use with power rollers comprises a sectionally circular inner ring raceway, but being annular as a whole, formed on one axial side face of the power roller incorporated in a toroidal-type continuously variable transmission; an outer ring arranged coaxially with the power roller; a sectionally circular outer ring raceway, but being annular as a whole, formed on the portion of one axial side face of the outer ring which faces the aforesaid inner ring raceway; and a plurality of balls, each of the rolling surfaces of which are in contact with the inner and outer ring raceways. This thrust ball bearing also satisfies the conditions (a) and (b) given below.

(a) The contact angle of each of the aforesaid balls is not 90 degrees.

(b) The contact angle is such that the distance between the acting point of loads exerted on the circumferential surface of the power roller, and the contact point of the rolling surface of the balls and the inner ring raceway is smaller than the corresponding distance for a contact angle of 90 degrees.

With a thrust ball bearing of the present invention for use with power rollers structured as described above, the power rollers are not easily displaced in the radial direction by the application of the radial loads. Therefore, the motion of balls is not easily complicated, hence rarely producing adverse effects on the frictional wear of balls, outer and inner ring raceways, and the fatigue life as well.

Also, the distance becomes smaller between the acting point of loads applied to the power roller, and the contact point of the rolling surface of each ball and the inner ring raceway, hence making it possible to reduce the bending stresses exerted on the power roller due to the loads applied to the contacting portion between the power roller and discs. As a result, the durability of the power roller can be enhanced.

In accordance with another of its aspects, a thrust ball bearing of the present invention for use with power rollers comprises a sectionally circular inner ring raceway, but being annular as a whole, formed on one axial side face of the power roller incorporated in a toroidal-type continuously variable transmission; an outer ring arranged coaxially with the power roller; a sectionally circular outer ring raceway, but being annular as a whole, formed on the portion of one side face of the outer ring which faces the aforesaid inner ring raceway; and a plurality of balls each of the rolling surfaces of which is in contact with the inner and outer ring raceways in the same manner as the conventional thrust bearing for use with power rollers. The portion of one axial side face of the outer ring, which is closer to the inner circumference of the outer ring than the outer ring raceway, is positioned to be inside the axial portion which is closer to the outer circumference than the outer ring raceway. Also, the portion of one axial side face of the power roller, which is closer to the outer circumference than the inner ring raceway, is positioned to be inside the axial portion which is closer to the outer circumference than the inner ring raceway.

With a thrust ball bearing of the present invention for use with power rollers structured as described above, it is possible to avoid making the height dimension of a thrust ball bearing larger as a whole or making the width dimension of the circumference of the power roller larger. It is also possible to enhance the strength of the outer ring against the bending stresses exerted by the application of the thrust loads. Therefore, at the same time that the transmitting efficiency of a toroidal-type continuously variable transmission can be secured, it is possible to make the transmission lighter and smaller while maintaining its durability.

DETAILED DESCRIPTION OF THE PREFERRED EMBODIMENTS

Hereinafter, with reference to the accompanying drawings, a detailed description will be made of preferred embodiments in accordance with the present invention.

Figure 1:
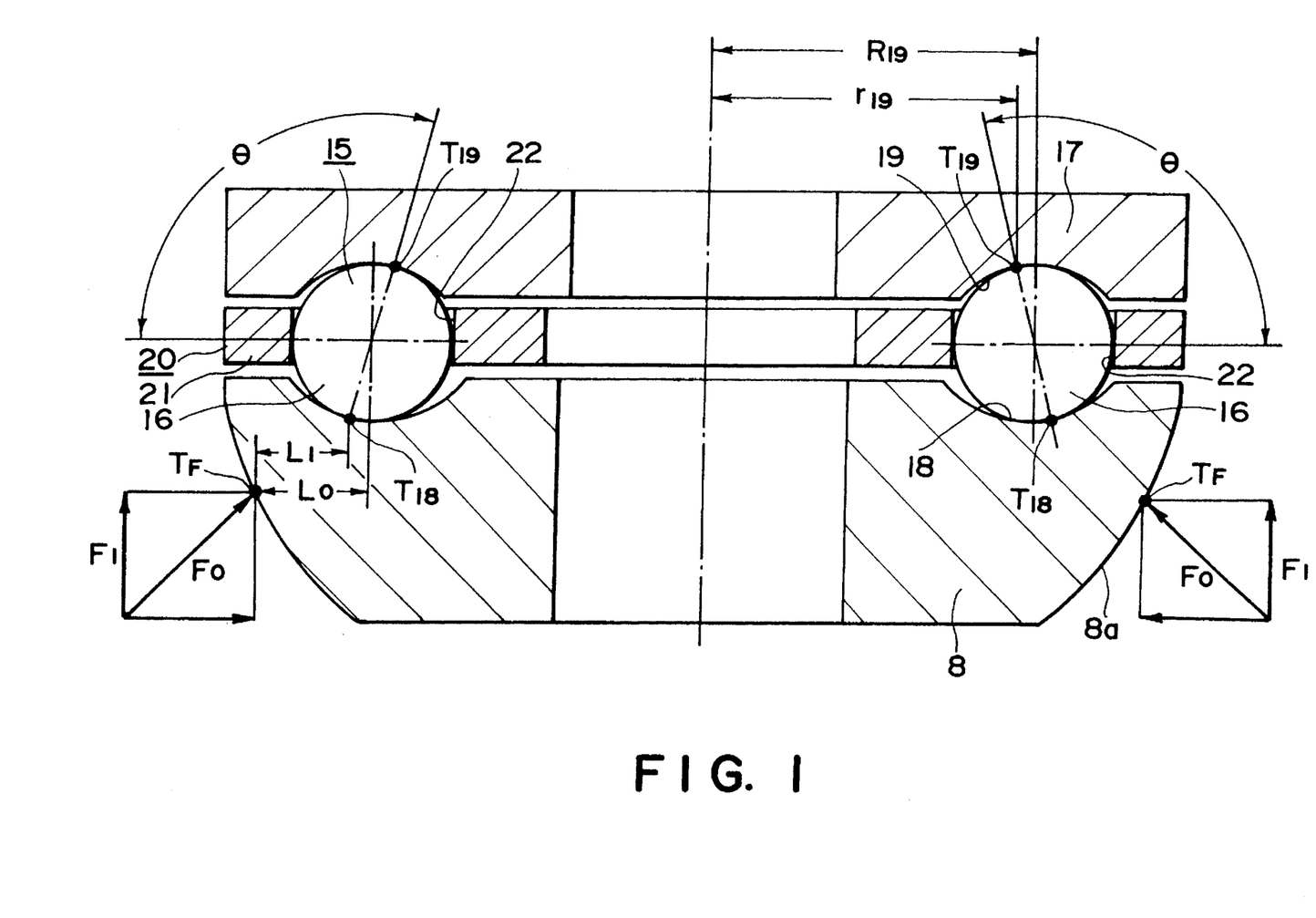
FIG. 1 is a cross-sectional view which shows a first embodiment in accordance with the present invention.

FIG. 1 is a view which shows a first embodiment according to the present invention. Here, the features of the thrust ball bearing in accordance with the present invention for use with power rollers are that its durability is enhanced by deviating the contact angle of balls from 90 degrees. The other structures and functions are the same as those of the thrust ball bearing conventionally known for use of power rollers which is incorporated in the toroidal-type continuously variable transmission described earlier. Therefore, descriptions thereof will be omitted. The description will concentrate on the features of the present invention.

The diameter of the inner ring raceway 18 formed on one side face (the upper face in FIG. 1) of the power roller 8 is arranged to be smaller than the diameter of the outer ring raceway 19 formed on one side face (the lower face in FIG. 1) of the outer ring 17. Therefore, the contact angle θ of the balls 16 rotatively provided between the inner ring raceway 18 and the outer ring raceway 19 is larger than 90 degrees. As a result, compared to the case where the contact angle θ is 90 degrees (see FIG. 6), the contacting position $T_{18}$ of the rolling surface of each of the balls 16 and the inner ring raceway 18 is located outwardly in the diametral direction, and the contacting position $T_{19}$ of the rolling surface and the outer ring raceway 19 is located inwardly in the diametral direction.

In the present embodiment, the contacting position $T_F$ of the inner faces 2a and 4a (FIG. 3 and FIG. 4) of the discs 2 and 4 on the input and output sides and the circumferential surface 8a of the power roller 8 is farther outside, in the diametral direction, than the contacting position $T_{18}$ of the rolling surface of each of the balls 16 and the inner ring raceway 18. Therefore, the distance $L_1$ in the radial direction between an acting point of loads (that is, contacting position $T_F$) and a corresponding contacting position $T_{18}$ becomes smaller than the distance $L_0$ for a contact angle θ of 90 degrees ($L_1 < L_0$). Also, the radius $r_{19}$ of a circle connecting the contacting positions $T_{19}$ of the rolling surfaces and the outer ring raceway 19 becomes smaller than the radius $R_{19}$ for a contact angle θ of 90 degrees ($r_{19} < R_{19}$).

In the case of the thrust ball bearing of the present invention for use with power rollers structured as described above, the power roller 8 is not easily displaced in the radial direction by the application of the radial loads. In other words, since the aforesaid contact angle θ exceeds 90 degrees, parts of balls 16 support the radial loads when the radial loads are exerted in either directions. Hence the power roller 8 is blocked from being displaced in the radial direction. For example, when radial loads are exerted in the direction from left to right in FIG. 1, the ball 16 on the left side in FIG. 1 supports the radial loads. As a result, the motion of each of the balls 16 is not complicated, thus rarely producing adverse effects on the frictional wear of the balls 16, both outer and inner ring raceways 19 and 18, and fatigue life as well.

Also, the distance $L_1$ in the radial direction between the acting point ($T_F$) of loads exerted on the power roller 8 and the contacting position ($T_{18}$) of the rolling surface of each of the balls 16 and the inner ring 18, is smaller than the distance $L_0$ in the radial direction when the aforesaid angle θ is 90 degrees. Consequently, the bending stresses applied to the power roller 8 become smaller under the loads $F_0$ exerted on the contacting part between the circumferential surface 8a of the power roller 8 and the inner side faces 2a and 4a of the discs 2 and 4. Hence it is possible to enhance the durability of the power roller 8.

Also, in the case of the embodiment shown in FIG. 1, the radius $r_{19}$ of a circle connecting the plural contacting positions $T_{19}$ of the rolling surfaces of each of the balls 16 and outer ring raceway 19 becomes smaller than the radius $R_{19}$ when the aforesaid contact angle θ is 90 degrees, ($r_{19} < R_{19}$). Consequently, the bending stresses applied to the outer ring 17 can be made smaller irrespective of the thrust loads exerted on the outer ring 17 by each of the balls 16. In other words, in a ball bearing supporting the power roller 8 of a toroidal-type continuously variable transmission, the portion close to the center of the outer ring 17 may be supported, but not the portion close to the outer circumference thereof. It is also possible to make the aforesaid bending stresses smaller and implement the enhancement of the durability of the outer ring 17 because the aforesaid contacting positions $T_{19}$ are deviated inside, in the diametral direction, relative to the contacting positions when the contact angle θ is 90 degrees.

Figure 2:
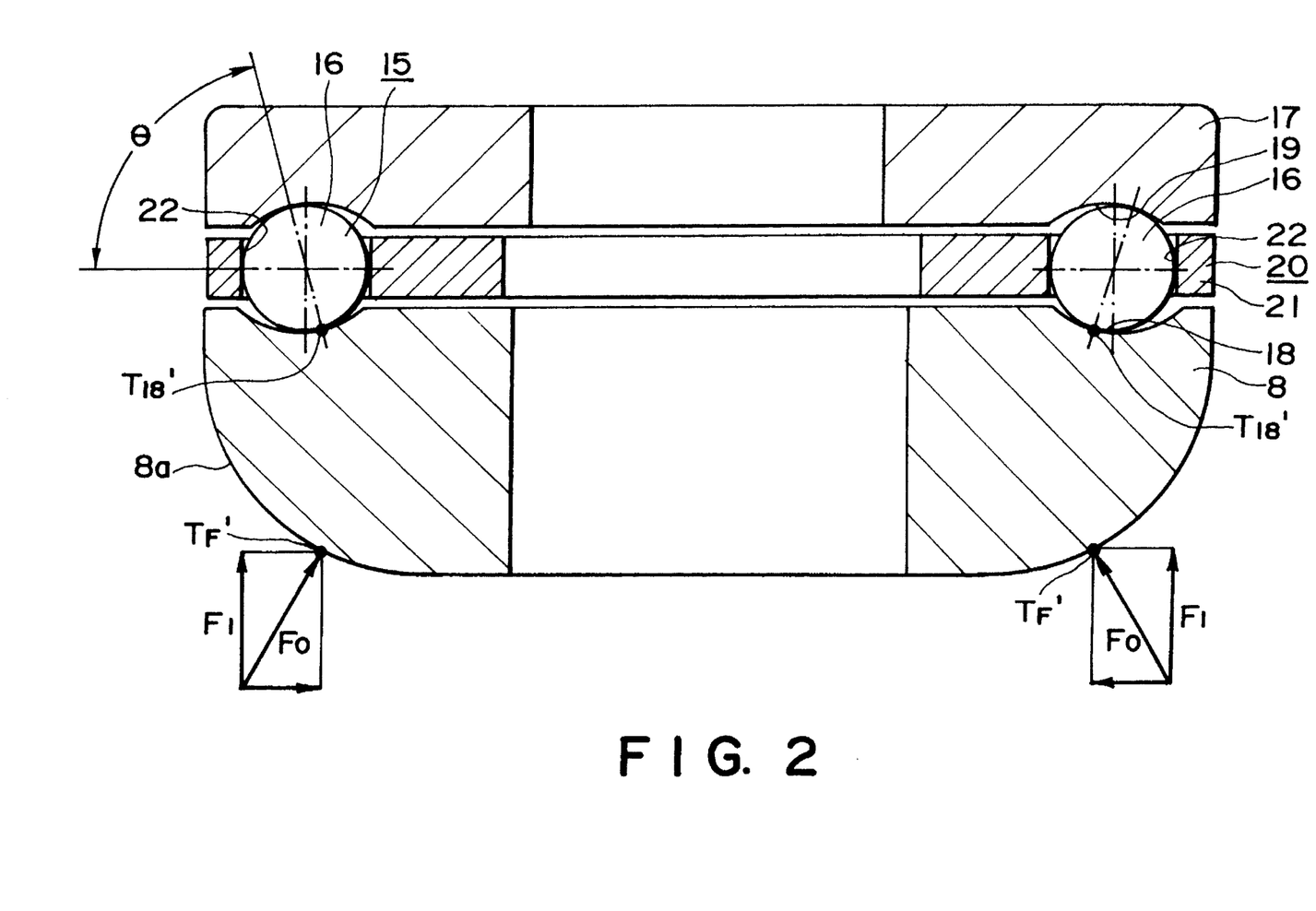
FIG. 2 is a cross-sectional view which shows a second embodiment in accordance with the present invention.

FIG. 2 is a view which shows a second embodiment in accordance with the present invention. In the present embodiment, the contacting position $T_F'$ between the inner side faces 2a, 4a (FIG. 3 and FIG. 4) of the discs 2, 4 on the input and output sides and the circumferential surface 8a of the power roller 8 is present further inside the diametral direction, than the contacting position $T_{18}'$ between the rolling surface of each of the balls 16 and the inner ring raceway 18. To agree with this, the diameter of the inner ring raceway 18, formed on one side face (the upper face in FIG. 2) of the power roller 8, is made slightly larger than the diameter of the outer ring raceway 19 formed on one side face (the lower face in FIG. 2) of the outer ring 17 in the present embodiment. As a result, the contact angle θ of the balls 16 rotatively provided between the inner ring raceway 18 and outer ring raceway 19 becomes smaller than 90 degrees.

As in the first embodiment described above, the power roller 8 is not easily displaced in the radial direction due to the radial loads in the present embodiment. The motion of the balls 16 is not complicated, thus rarely producing adverse effects on the frictional wear of the balls 16, both outer and inner ring raceways 19 and 18, and fatigue life as well. Also, the distance in the radial direction between the acting point of loads exerted on the power roller 8, and the contacting position $T_{18}$, of the rolling surface of each of the balls 16 and the inner ring raceway 18 becomes smaller. Consequently, the bending stresses applied to the power roller 8 become smaller under the loads $F_0$ exerted on the contacting part between the power roller 8 and the inner side faces 2a and 4a of the discs 2 and 4. Hence it is possible to enhance the durability of the power roller 8.

The thrust ball bearing of the present invention for use with power rollers in accordance with the first and second embodiments is structured to function as described above. It is therefore possible to achieve the reduction of frictional wear of each of the constituents, prolong the fatigue life thereof, and reduce the bending moment, thus significantly enhancing reliability and durability of the thrust ball bearing as a whole.

Figure 8:
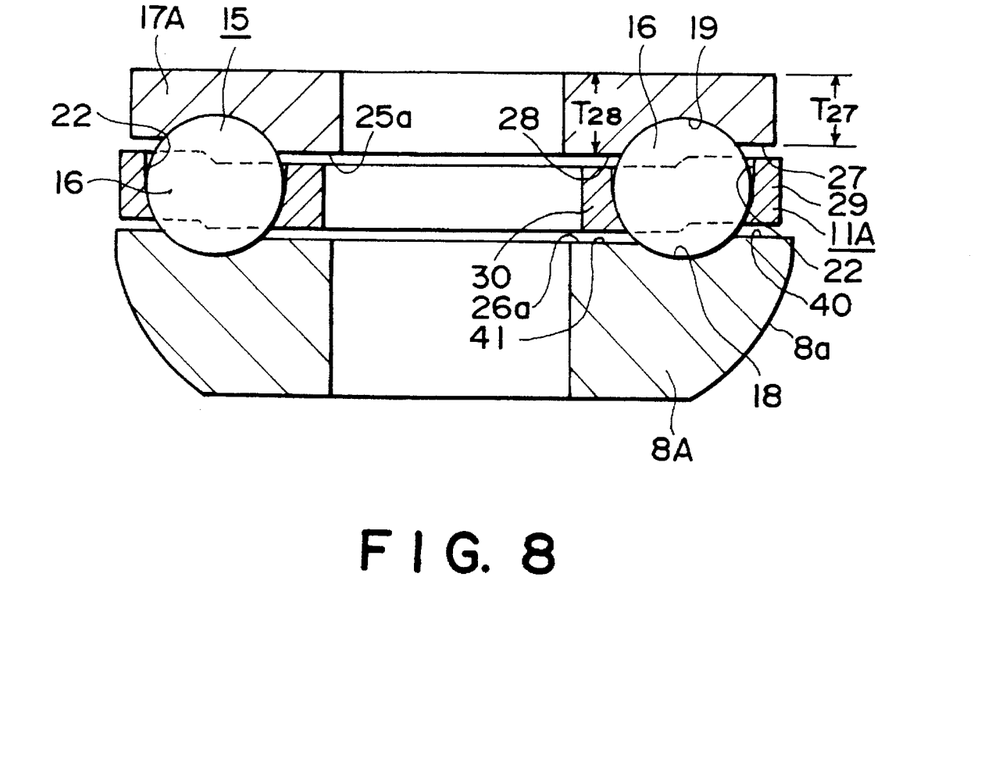
FIG. 8 is a cross-sectional view which shows a third embodiment in accordance with the present invention.

FIG. 8 is a view which shows a third embodiment in accordance with the present invention. In this respect, the size of a thrust ball bearing for use with power rollers differs slightly depending on the power to be transmitted by use of a toroidal-type continuously variable transmission.

In FIG. 8, a power roller 8A is provided with an annular inner ring raceway 18 on its one axial side face 26a. Also, the outer ring 17A, which is coaxially arranged with the power roller 8A, is provided with an annular outer ring raceway 19 on the portion which is a part of one axial side face 25a thereof facing the inner ring raceway 18. Between the inner ring raceway 18 and outer ring raceway 19, a plurality of balls 16 are rotatively provided.

On the one axial side face 25a of the outer ring 17A, a step is arranged with the aforesaid portion of the outer ring raceway 19 as a boundary. With this step, the portion 28 closer to the inner circumference than the outer ring raceway 19 of the one axial side face 25a of the outer ring 17A is positioned in the axial direction of the portion 27 closer to the outer circumference than the outer ring raceway 19. That is, the portion 28 is positioned inside the bearing.

Also, on the one axial side face 26a of the power roller 8A, a step is arranged with the inner ring raceway 18 a boundary. The distance between the axial side faces 25a and 26a themselves is almost even beginning at the inner side and continuing to the outer side in the diametral direction. In other words, the portion 40 closer to the outer circumference than the inner ring raceway of the one axial side face 26a of the power roller 8A is positioned inside in the axial direction of the portion 41 closer to the inner circumference than the inner ring raceway. That is, the portion 40 it is positioned inside the bearing.

Further, on both axial side faces of a cage 11A which rotatively holds the balls 16 steps are arranged with pockets 22 as each of the boundaries. In other words, the portion 29 close to the outer circumference of this cage 11A is offset toward the outer ring 17A side, and the portion 30 close to the inner circumference is offset toward the power roller 8A side. Therefore, it is possible to prevent the cage 11A from interfering with the side faces 26a and 25a of the power roller 8A and outer ring 17A without making this cage 11A particularly thinner.

With a thrust ball bearing of the present invention for power rollers structured as described above, it is possible to enhance the strength of the outer ring 17A against the bending stresses due to the thrust loads without making the height dimension H (see FIG. 11) larger for the thrust ball bearing as a whole or making the width dimension of the circumferential surface 8a of the power roller 8 smaller.

When a toroidal-type continuously variable transmission is in operation, bending stresses are exerted on the outer ring 17A due to the thrust loads applied to the outer ring 17A by the balls 16. The bending stresses are exerted on the portion 28 close to the inner circumference between the outer ring raceway 19 and the thrust bearing 23, but in a case of a thrust ball bearing of the present invention for use with power rollers, it is possible to secure the thickness dimension $T_{28}$ of the outer ring 17A in the portion 28 close to the inner circumference. As a result, the generation of damage such as cracks on the outer ring 17A is rare despite the bending stresses which are repeatedly exerted while the toroidal-type continuously variable transmission is in operation, thus making it possible to enhance the durability of the outer ring 17A.

Also, since there is no particular exertion of bending stresses on the part 27 close to the outer circumference of the outer ring 17A, it is unnecessary to make the thickness dimension $T_{27}$ of the outer ring larger in the portion 27 close to the outer circumference (rather it is possible to make it smaller). Therefore, the width dimension of the circumferential surface 8a of the power roller 8A can be sufficiently secured by making the thickness dimension of the outer circumferential portion of the power roller 8A large enough. As a result, good transmitting efficiency of a toroidal-type continuously variable transmission can be secured by making the contacting surface sufficiently large between the circumferential surface 8a and the inner side faces 2a, 4a of the discs 2 and 4 on the input and output sides.

Figure 9:
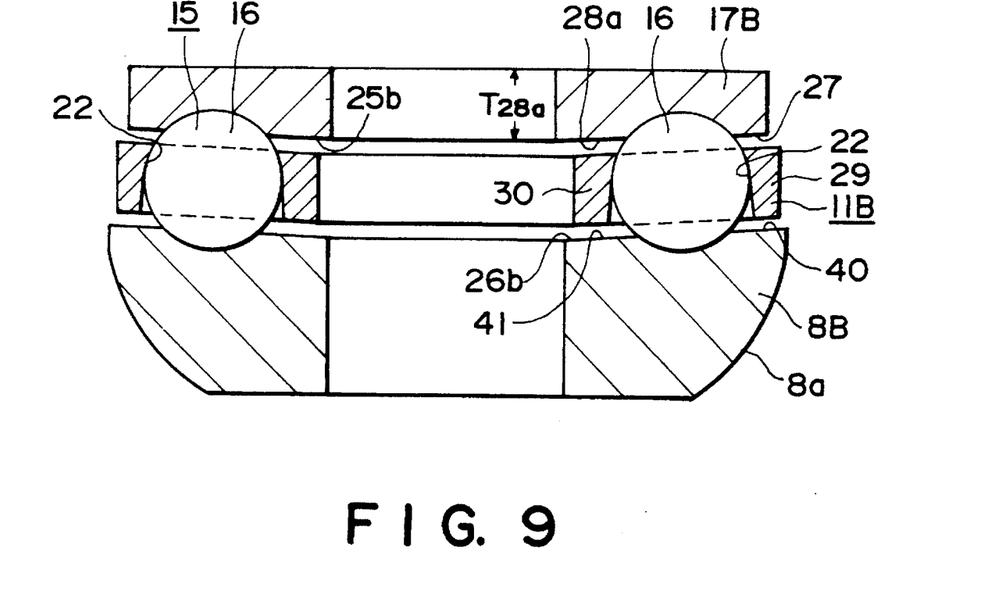
FIG. 9 is a cross-sectional view which shows a fourth embodiment in accordance with the present invention.

FIG. 9 is a view which shows a fourth embodiment in accordance with the present invention. In the present embodiment, the one axial side face 26b of the power roller 8B is a conically concave surface, and the one axial side face 25 of the outer ring 17B is a conically convex surface. Also, the configuration of a cage 11B is arranged to be inclined along the conical surfaces in order to make it agreeable with the configurations of the one side faces 26b and 25b. In other words, the portion 28a closer to the inner circumference than the outer ring raceway of the one axial side face 25b of the outer ring is positioned inside, in the axial direction, of the portion 27 closer to the outer circumference than the outer ring raceway. Also, the portion 40 closer to the outer circumference than the inner ring raceway of the one axial side face 26b of the power roller is positioned, inside in the axial direction, of the portion 41 closer to the inner circumference than the inner ring raceway. Therefore, it is possible to achieve the desired dimension $T_{28a}$ of the outer ring 17B of the portion 28a closer to the inner circumference while sufficiently securing the width dimension of the circumferential surface 8a, of the power roller 8B which functions as a traction surface. Hence the strength of the outer ring 17B can be enhanced.

A thrust ball bearing of the present invention for use with power rollers in accordance with the third and fourth embodiments is structured to function as described above. It is therefore possible to enhance the strength of the outer ring, and secure the durability of the outer ring sufficiently despite the bending stresses exerted by the application of the thrust loads, thus enabling the provision of a small and light toroidal-type continuously variable transmission having excellent power transmission efficiency.

What is claimed is:

1. In a toroidal-type continuously variable transmission, a power roller assembly that transmits force from an input disc to an output disc, said power roller assembly comprising:

a power roller that rotates about a rotation axis, said power roller having an axial end face formed with an annular raceway of substantially circularly arcuate cross section;

an outer ring arranged coaxially with said power roller, said outer ring having an axial end face formed with an annular raceway of substantially circularly arcuate cross section facing said raceway of the power roller; and a plurality of balls, each having a rolling surface that contacts said raceway of the power roller and said raceway of the outer ring at first and second contacting positions, respectively, said first and second contacting positions defining a contact line that is inclined relative to said rotation axis of the power roller at an angle that remains substantially fixed throughout rotation of said power roller about said rotation axis, wherein resultant forces from said input and output discs are applied to a circumferential surface of said power roller at first and second acting points, respectively, and the contact lines of said balls are inclined such that when the contact line of each ball is disposed adjacent to one of said acting points in an axial plane, a component of distance between the adjacent acting point and the first contacting position of the ball in a direction perpendicular to said rotation axis is smaller than a component of distance between the adjacent acting point and a center of the ball in the same direction.

2. A power roller assembly according to claim 1, wherein the raceway of the power roller and the raceway of the outer ring have different central diameters.

3. In a toroidal-type continuously variable transmission, a power roller assembly that transmits force from an input disc to an output disc, said power roller assembly comprising:

- a power roller that rotates about a rotation axis, said power roller having an axial end face formed with an annular raceway of substantially circularly arcuate cross section;

- an outer ring arranged coaxially with said power roller, said outer ring having an axial end face formed with an annular raceway of substantially circularly arcuate cross section facing said raceway of the power roller; and

- a plurality of balls, each having a rolling surface that contacts said raceway of the power roller and said raceway of the outer ring at first and second contacting positions, respectively, said first and second contacting positions defining a contact line that is inclined relative to said rotation axis of the power roller at an angle that remains substantially fixed throughout rotation of said power roller about said rotation axis.

4. A power roller assembly according to claim 3, wherein the raceway of the power roller and the raceway of the outer ring have different central diameters.

5. A power roller assembly for transmitting force from an input disc to an output disc in a toroidal-type continuously variable transmission, said power roller assembly comprising:

- a power roller that rotates about a rotation axis, said power roller having an axial end face formed with an annular raceway of substantially circularly arcuate cross section;

- an outer ring arranged coaxially with said power roller, said outer ring having an axial end face formed with an annular raceway of substantially circularly arcuate cross section facing said raceway of the power roller; and

- a plurality of balls, each having a rolling surface that contacts said raceway of the power roller and said raceway of the outer ring at first and second contacting positions, respectively, said first and second contacting positions defining a contact line that is inclined relative to said rotation axis of the power roller at an angle that remains substantially fixed throughout rotation of said power roller about said rotation axis, wherein resultant forces from said input and output discs are applied to a circumferential surface of said power roller at first and second acting points, respectively, and the contact lines of said balls are inclined such that when the contact line of each ball is disposed adjacent to one of said acting points in an axial plane, a component of distance between the adjacent acting point and the first contacting position of the ball in a direction perpendicular to said rotation axis is smaller than a component of distance between the adjacent acting point and a center of the ball in the same direction.

6. A power roller assembly according to claim 5, wherein the raceway of the power roller and the raceway of the outer ring have different central diameters.

7. A power roller assembly for transmitting force from an input disc to an output disc in a toroidal-type continuously variable transmission, said power roller assembly comprising:

- a power roller that rotates about a rotation axis, said power roller having an axial end face formed with an annular raceway of substantially circularly arcuate cross section;

- an outer ring arranged coaxially with said power roller, said outer ring having an axial end face formed with an annular raceway of substantially circularly arcuate cross section facing said raceway of the power roller; and

- a plurality of balls, each having a rolling surface that contacts said raceway of the power roller and said raceway of the outer ring at first and second contacting positions, respectively, said first and second contacting positions defining a contact line that is inclined relative to said rotation axis of the power roller at an angle that remains substantially fixed throughout rotation of said power roller about said rotation axis.

8. A power roller assembly according to claim 7, wherein the raceway of the power roller and the raceway of the outer ring have different central diameters.

* * * * *